United States Patent [19]

Bonar

[11] Patent Number: 4,692,764
[45] Date of Patent: Sep. 8, 1987

[54] AUTOMATIC RANGE FINDER AND REMOTE CONTROLLER BRAKING SYSTEM

[76] Inventor: George D. Bonar, 333 Bowery, New York, N.Y. 10003

[21] Appl. No.: 876,979

[22] Filed: Jun. 20, 1986

[51] Int. Cl.$^4$ ............................................. G01S 13/93
[52] U.S. Cl. ...................................... 342/71; 342/175
[58] Field of Search .............. 343/5 BB, 5 EM, 5 PD, 343/7 ED, 7 VC, 7 VM, 18 C; 342/27-29, 41, 61, 69-72, 118

[56] References Cited

U.S. PATENT DOCUMENTS

| | | | |
|---|---|---|---|
| 2,770,801 | 11/1956 | Jones | 343/18 C |
| 2,851,120 | 9/1958 | Fogiel | 343/7 VM X |
| 3,166,278 | 1/1965 | Steinbach et al. | 343/7 VC |
| 3,689,882 | 9/1972 | Dessailly | 343/7 VM |
| 3,786,507 | 1/1974 | Hurd, Jr. | 343/7 VM |
| 3,824,592 | 7/1974 | Mehltretter | 343/7 VM X |
| 4,097,864 | 6/1978 | Endo et al. | 343/7 VM |
| 4,104,632 | 8/1978 | Fujiki et al. | 343/7 VM |
| 4,205,313 | 5/1980 | Pease | 343/5 EM X |
| 4,208,658 | 6/1980 | Fujiki et al. | 343/7 VM |
| 4,308,536 | 12/1981 | Sims, Jr. et al. | 343/7 VM |
| 4,543,577 | 9/1985 | Tachibana et al. | 343/7 VM X |
| 4,551,722 | 11/1985 | Tsuda et al. | 343/7 VM X |

OTHER PUBLICATIONS

G. Ross, "Narrowing the Effective Beamwidth of a Baseband Radar for Auto Braking Application"; 1978 Intl. Symposium Digest on Antennas and Propagation, pp. 296-301.

J. Shefer et al., "Clutter-Free Radar for Cars"; *Wireless World*, (vol. 80, No. 1461, pp. 117-122; 5/74).

Primary Examiner—T. H. Tubbesing
Assistant Examiner—Bernarr Earl Gregory
Attorney, Agent, or Firm—Richard L. Miller

[57] ABSTRACT

An automatic range finder and remote controlled braking system is provided. When mounted to a vehicle, this system senses the distance between the equipped vehicle and any other vehicle or object in front of it and sets off a warning alarm when the separating distance is less than some preset value. As the distance continues to close, when the distance closes to some preset braking distance, a braking alarm is activated, and controlled breaking, proportional to the rate of change of distance with respect to time commences. The actual distance is always displayed. Additional braking is accomplished by applying increased breaking force to the conventional brake pedal while a panic button can be used to disable the automatic braking entirely. The beamwidth of the corner reflector type antenna is controlled for calibration purposes by adjusting the lateral placement of the radiating dipole using a motor and worm drive system.

6 Claims, 4 Drawing Figures

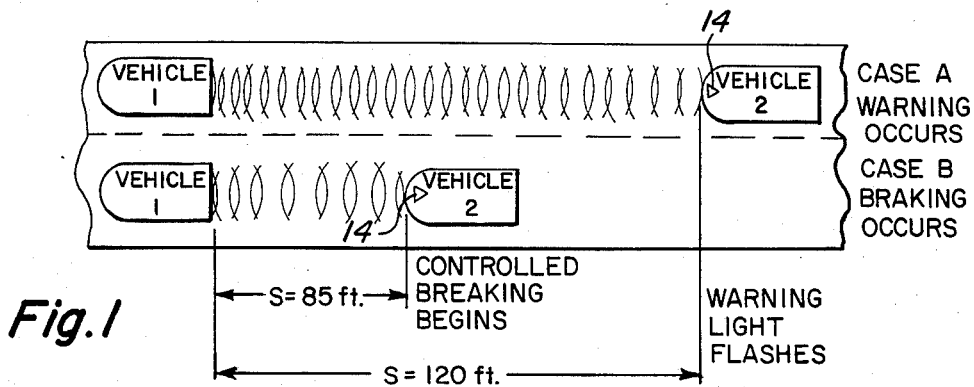
Fig. 1
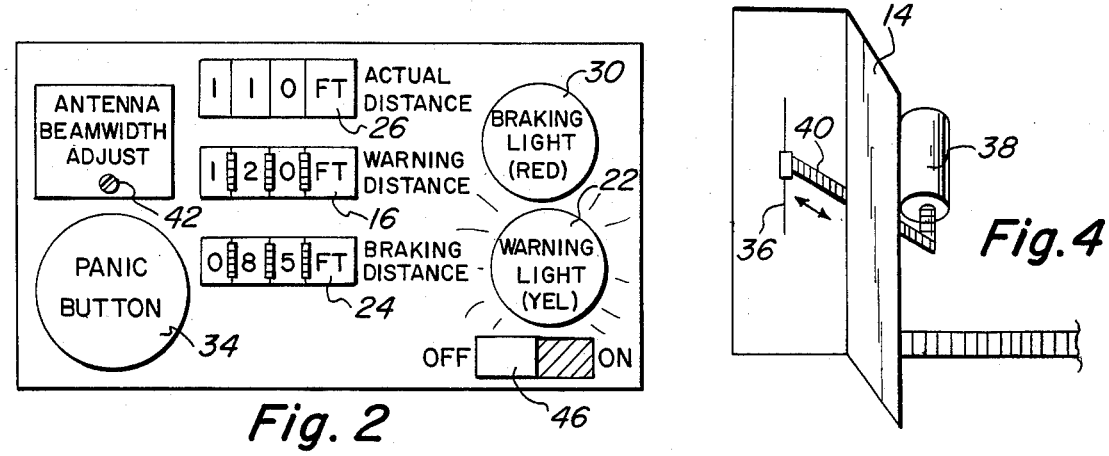
Fig. 2
Fig. 4
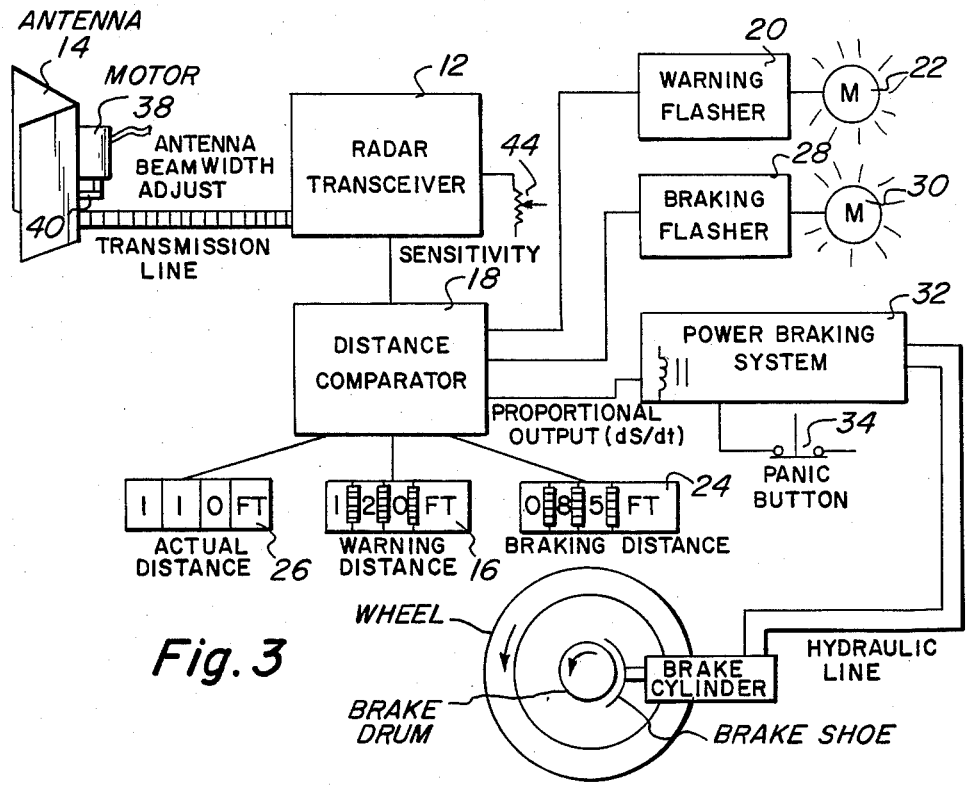
Fig. 3

AUTOMATIC RANGE FINDER AND REMOTE CONTROLLER BRAKING SYSTEM

BACKGROUND OF THE INVENTION

This application was the subject of a disclosure document No. 141666 filed in the U.S. Patent Office on Sept. 25, 1985.

The present invention relates generally to the field of vehicle braking systems, and, more specifically, to those systems which automatically cause the braking of a vehicle in response to the presence of any object in front of the vehicle.

At the present state of the art vehicles are typically braked by the application of a proportional controlling force on a brake pedal in response to the interpretation by the vehicle's operator of sensory inputs as an object in the path or potential path of his vehicle. Any impairment of the operator's sensory apparatus or cognitive apparatus, whether caused by fatigue, ill health, inattention, alcohol, or drugs will interfere with the application of appropriate braking. Braking will occur too early, too late, or with inappropriate force. While there are various patents such as U.S. Pat. Nos.: 3,718,201; 3,892,483; and 3,905,441 which all have some commonality with the instant invention zone are as suitable for the intended purpose nor have the same structure. Therefore there is a need for an improvement over such prior art devices.

SUMMARY OF THE INVENTION

It is, therefore, a primary object of the present invention to provide an automatic range finder and remote controlled braking system which uses radar to judge the distance and rate of approach to an obstruction in front of the vehicle and applies the vehicle's brakes at an appropriate time and with appropriate force.

Another object is to provide an automatic range finder and remote controlled braking system which allows the vehicle operator to monitor the distance between his vehicle and such obstruction.

Yet another object is to provide an automatic range finder and remote controlled braking system which allows the vehicle operator to preset the distance at which a warning light will flash when the distance between the vehicle and such obstruction is less than the preset warning distance.

Still another object is to provide an automatic range finder and remote controlled braking system which allows the vehicle operator to preset the distance at which braking will commence when the distance between the vehicle and such obstruction is less than the preset braking distance.

Yet still another object is to provide an automatic range finder and remote controlled braking system which allows the vehicle operator to preset the angle of detection of the system so that only obstructions within the given angle will be detected and avoided.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a diagrammatic drawing of the invention in use.

FIG. 2 is a front view of the control unit typically mounted to the dashboard of an automobile.

FIG. 3 is a block diagram of the invention.

FIG. 4 is a perspective view of the antenna illustrating the beamwidth adjusting mechanism.

DETAILED DESCRIPTION OF THE PREFERRED EMBODIMENTS

Examining the figures more closely, it will be seen in FIG. 1 the sequence events that occur as vehicle 2 (the one with the instant invention on board) begins to approach vehicle 1 in a situation which might result in a fatal disaster if the operator is not alert, or exercises poor judgement.

In Case A, radar transceiver 12, of conventional design, outputs bursts of radio frequency energy from Vehicle 2's antenna 14, which strike vehicle 1, and bounce back to antenna 14, resulting in an output signal from radar transceiver 12 proportional to the distance between the vehicles. A distance of 120 feet has been set on warning distance setting device 16, which is typically a thumb-wheel switch. Since the actual distance between the vehicles is 120 feet, equal to the preset warning distance, the distance comparator 18 outputs a signal to warning flasher 20 that causes warning lamp 22 to flash. The vehicle operator is thereby warned that an automatic braking situation is impending. Obviously, any other warning system, such as an audible alarm might be used.

In Case B, the warning lamp 22 has already been flashing for some time. The distance between Vehicle 2 and Vehicle 1 has been reduced to 85 feet. The automatic braking distance of 85 feet was set on braking distance setting device 24. When the actual distance as indicated on actual distance display 26 drops to 85 feet, distance comparator 18 outputs a signal to braking flasher 28 which causes braking lamp 30 to flash. The vehicle operator is warned that automatic braking has commenced.

Meanwhile, distance comparator 18, which constantly monitors the rate at which the distance between the vehicles is decreasing, outputs a signal proportional to this rate of change of distance with respect to time, ds/dt, to power braking system 32. The faster the vehicles are closing, the greater ds/dt becomes, and the more power the power braking system 32 applies. Conversely, the slower the vehicles are closing, the less ds/dt becomes, and the less power the power braking system 32 applies. It is this proportional control of braking which gives the system its ability to perform controlled braking to a halt if necessary.

At any time the vehicle operator can apply additional braking power by stepping with more force on the conventional brake pedal. He may also disable the automatic system at any time merely by hitting panic button 34 which disables the automatic connection to braking system 32.

In this application the beamwidth of antenna 14 is critical. If it is too narrow it may not detect a vehicle or an obstruction slightly off axis. If it is too wide than it may react of safely placed stationary objects such as stanchions as if they were dangerous obstructions. It is, therefore, necessary to be able to calibrate the system using an adjustable beamwidth. For this purpose, antenna 14, configured as a corner reflector, is equipped with a dipole 36 which can be moved laterally in the bisecting plane of the reflector, thereby controlling the beamwidth. A motor 38 coupled to worm drive 40 produces this motion. The lateral placement of dipole 36 is controlled by antenna beamwidth adjustment 42 which is shown as a screwdriver slot adjustment since it is normally adjusted once and then left alone. For further calibration a sensitivity control 44 is provided. The entire system can be turned on and off using switch 46 which in its off position restores conventional manual braking to the vehicle.

While certain novel features of this invention have been shown and described and are pointed out in the annexed claims, it will be understood that various omissions, substitutions and changes in the forms and the details of the device illustrated and in its operation can be made by those skilled in the art without departing from the spirit of the invention.

What is claimed is:

1. An automatic range finder and remote controlled braking system, comprising:
   (a) a radar receiver;
   (b) an antenna connected to said radar transceiver, mounted to a vehicle such that said antenna faces in the forward direction relative to the normal direction of travel of said vehicle;
   (c) an electrical braking distance setting whose output is an electrical analog of the distance at which said vehicle's brakes are to begin actuating in the presence of an object in front of said antenna;
   (d) a distance comparator having three output signals, said comparator compares the distance output of said radar to the distance setting of said braking distance setting system and outputs a first output signal when the distance output of said radar is less than or equal to the distance setting of said braking distance setting system;
   (e) a braking system is actuated by the first output signal of said distance comparator, wherein said first output signal of said comparator is proportional to the rate of change of distance between said vehicle and an object with respect to time, and wherein said braking system is capable of proportional control, such that the first output of said distance comparator causes harder braking when said distance between said vehicle and said object is closing rapidly and causes softer braking when said closing is more gradual;
   (f) a braking flasher and a braking lamp which are connected to a second output signal of said distance comparator such that when said braking system is actuated said braking lamp flashes, thereby warning the operator that the system is causing said vehicle to brake;
   (g) an electrical warning distance setting system whose output is an electrical analog of the distance at which a warning is to be outputted telling an operator of said vehicle that a desired minimum separation has been reached between said operator's vehicle and an object in front of said vehicle; wherein the distance comparator's third output signal is activated whenever the distance between said vehicle and said object are less than the preset warning distance; and
   (h) a warning flasher and warning light which are connected to said third output signal of said distance comparator such that when the distance between said vehicle and said object are less than the preset warning distance said warning distance said warning light flashes.

2. An automatic range finder and remote controlled braking system, as recited in claim 1, further comprising an actual distance indicator which indicates to the operator of said vehicle the actual distance between said vehicle and an object in front of said vehicle.

3. An automatic range finder and remote controlled braking system, as recited in claim 1, further comprising a panic button which disables automatic features of said braking system thereby allowing manual operation of said system.

4. An automatic range finder and remote controlled braking system, as recited in claim 1, wherein said antenna comprises a forward-facing corner reflector forming an acute angle therebetween with dipole radiator between said corner reflector, together with means for moving said dipole laterally along the bisecting plane of said corner reflector such that the beam width of said antenna may be varied in order that said system be calibrated to react only to those objects within some desired range of angular deviation.

5. An automatic range finder and remote controlled braking system, as recited in claim 4, wherein said means for moving said dipole laterally along the bisecting plane of said corner reflector comprise a motor and a worm drive, wherein said worm drive is connected between said dipole radiator and said motor together with means for actuating said motor.

6. An automatic range finder and remote controlled braking system, as recited in claim 4, wherein means for actuating said motor comprises an antenna beamwidth adjustment control.

* * * * *